Sept. 6, 1966 J. E. CLARK 3,271,124

SEMICONDUCTOR ENCAPSULATION

Filed Sept. 16, 1963

INVENTOR
J. E. CLARK
BY
Roderick B. Anderson
ATTORNEY 3,271,124
Patented Sept. 6, 1966

3,271,124

SEMICONDUCTOR ENCAPSULATION

James E. Clark, Upper Saucon Township, Lehigh County, Pa., assignor to Bell Telephone Laboratories, Incorporated, a corporation of New York Filed Sept. 16, 1963, Ser. No. 309,161
4 Claims. (Cl. 65—54)

Figure 1:
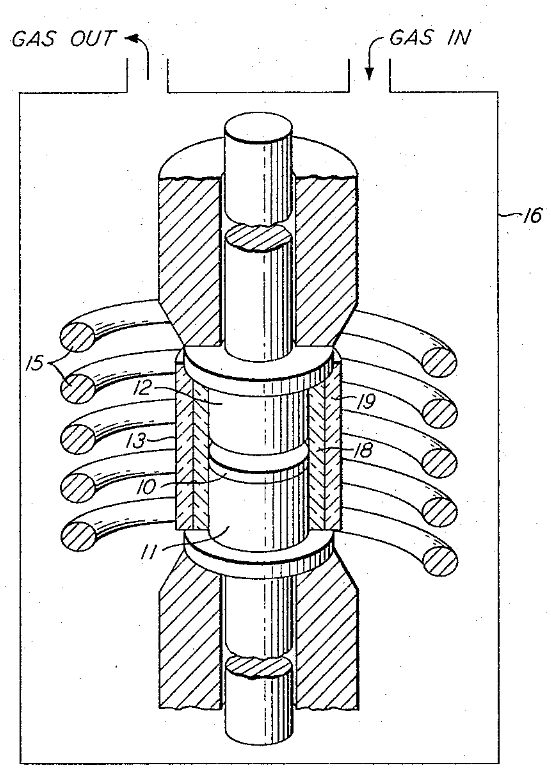

This invention relates to glass encapsulations for semiconductors.

My copending application, Serial No. 123,463, filed July 12, 1961, now Pat. No. 3,193,366, describes a method for sealing a semiconductor wafer within a glass encapsulation which reduces the heat that is necessary for forming the seal. Instead of exposing the wafer to molten glass, my prior method includes the steps of placing the wafer between two metal studs which are surrounded by a solid glass cylinder, heating the glass to reduce its viscosity, and then exposing the assembly to a sufficient ambient gaseous pressure to collapse the glass around the studs to form airtight seals. The studs thereafter act as electrical contacts to the wafer. This method desirably does not heat the wafer as much as in prior methods, which require physical contact between the wafer and high temperature molten glass.

Unfortunately, it has been found that, even at the reduced temperatures made possible by this process, some of the semiconductors suffer from degraded electrical characteristics as a result of the encapsulation. Accordingly, several other modifications were made to limit even further the heat which is transmitted to the wafer. For example, those parts of the studs which contact the wafer were reduced considerably in thickness so that they would act as thermal impedances to restrict the heat flow to the wafer. Also, by making the seals to the two studs separately, the heating was more localized. For example, one may initially make a seal between the glass cylinder and one of the studs, then insert the wafer, and thereafter seal the other end of the cylinder to the other stud through a localized heating arrangement that would minimize the heating of the semiconductor wafer. These and other modifications are effective to some extent in reducing the proportion of semiconductors that are damaged by encapsulation, but they increase the complexity and expense of the original process.

Further study indicated that it is probably not the heating alone which damages the semiconductor, but rather that contaminants are introduced to the semiconductor wafer during the encapsulation process. Study of the typical glass envelope showed that it contains certain volatile alkali constituents which are released when the glass is heated to a temperature sufficient for sealing. Some of these constituents were found to chemically combine with the semicondutcor to alter its electrical characteristics.. Studies of various glasses showed that these deleterious constituents are almost totally absent from alkali-free glasses, such as the glass which will be referred to as 167 KU glass. Unfortunately, it was found to be practically impossible to make alkali-free glasses with the required chemical durability necessary for withstanding normal use.

In accordance with the present invention, this problem is met by using a double-layered, or laminated, encapsulation—the inner layer being of an alkali-free composition and the outer layer being of a durable composition that is not alkali-free. Consideration of the processing involved makes it advantageous that the two glasses used have a similar coefficient of thermal expansion in order to avoid undue stress during the encapsulation. Further, the two glasses should have a compatible softening point temperature and viscosity so that they will both flow to the extent required for sealing. I then found that a commercially available grade of glass, designated in the glass-making art as 7052 glass, is chemically durable, and has a coefficient of thermal expansion, a softening point temperature, and a viscosity that are compatible with the particular alkali-free glass described as 167 KU glass.

Accordingly, it is a main feature of my invention to encapsulate by the process described above a semiconductive wafer within a laminated, or double-layered, glass tube, the inner layer being of a glass having a composition which is substantially alkali-free such as 167 KU glass, and the outer layer being of a glass which is chemically durable and which has a coefficient of thermal expansion, a softening point temperature, and a viscosity, that are compatible with the inner layer, such as 7052 glass for use with the alkali-free 167 KU glass.

Figure 2:
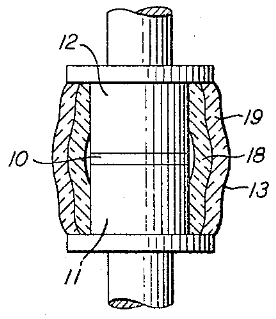

The objectives and features of my invention will be more clearly understood from a consideration of the following detailed description taken in conjunction with the accompanying drawing, in which:

FIG. 1 is an illustration of apparatus for encapsulating a semiconductive wafer in accordance with the invention; and FIG. 2 is an illustration of a semiconductor package in accordance with the invention.

Referring now to FIG. 1 there is shown equipment for encapsulating a semiconductive wafer according to the general principles disclosed in the aforementioned copending application. A wafer 10, made of a suitable semiconductive material such as silicon, is supported by a lower stud 11 and is in close proximity to an upper stud 12. Surrounding the wafer and shank portions of the studs is a glass envelope 13 which will be described in detail hereafter. The unsealed semiconductor package is surrounded by a heater coil 15 which in turn is surrounded by an enclosure 16. Gas-tight seals between the envelope and the two studs are formed by heating the envelope to a temperature above its softening point, as for example, 860° C. An inert gas such are argon or nitrogen is then pumped into the enclosure to exert a substantial pressure on the envelope 13, as for example, 16 to 20 pounds per square inch above atmospheric pressure. With the envelope in its softened, viscous condition, the upper stud 12 bears down on the wafer 10 by both the force of gravity and by the gas pressure to form a firm electrical contact, while the gas pressure collapses the envelope around both the upper and lower studs to form a hermetic seal. Upon cooling, a hermetic encapsulated semiconductor package is formed as shown in FIG. 2. The slight bulge that typically appears in the middle of the envelope is caused by the settling of the upper stud during encapsulation.

The semiconductor wafer used in one example of the above process was a silicon wafer coated with a layer of approximately 3000 angstroms of silicon oxide ($SiO_2$), although this process could be employed for encapsulating semiconductors having other compositions and configurations. The process is particularly preferable to prior processes in which the semiconductor is exposed to molten glass, because the temperatures involved in such processes can severely damage the semiconductor. However, as previously discussed, I have found that even at relatively low temperatures in the range of 750 to 870° C., the semiconductive wafer can be damaged by volatile alkali contaminants that escape from a conventional glass envelope when it is heated. These alkalis tend to combine with the oxides on the semiconductor surface to form a species of glass having electrical characteristics that are different from that of the uncontaminated coating. In order to eliminate this undesired contamination, the envelope of the embodiments of FIGS. 1 and 2 is formed of two distinct concentric layers 18 and 19. The inner layer 18 has a composition which is substantially free of volatile alkalis, such as for example, a glass which has been designated as 167 KU glass and which conforms approximately to the following specification:

TABLE I.—167 KU GLASS (PERCENTAGE BY WEIGHT)

| | |
|---|---|
| Silicon oxide ($SiO_2$) | 37.62 |
| Iron oxide plus aluminum oxides ($R_2O_3$) | 10.74 |
| Barium oxide (BaO) | 11.39 |
| Potassium oxide ($K_2O$) | .02 |
| Sodium oxide ($Na_2O$) | .08 |
| Boron oxide ($B_2O_3$) | 40.15 |
| | 100.00 |

For the purposes of this invention, an alkali-free glass is one whose composition meets the following minimum requirements:

TABLE II.—ALKALI-FREE GLASS (PERCENTAGE BY WEIGHT)

| | Less than |
|---|---|
| Sodium oxide ($Na_2O$) | .20 |
| Potassium oxide ($K_2O$) | 1.0 |
| Lithium oxide ($LiO_2$) | 2.0 |
| Total alkali content | 3.0 |

The above specification is based on the observation that sodium oxide is a particularly noxious semiconductor contaminant while the others are less troublesome to varying degrees.

Alkali-free glass such as 167 KU glass is effective for preventing semiconductor contamination, but it is so chemically undurable that it will eventually deteriorate even under normal atmospheric conditions. Therefore, an outer layer 19 is incorporated into the envelope to protect the chemically sensitive inner layer. In order to be used in the above-described process, however, it can be appreciated that the outer layer must have a coefficient of thermal expansion and a softening point temperature which are compatible with the inner layer 18. I have found that a glass known in the art as 7052 glass meets these requirements and is sufficiently strong and durable to meet the rigors of normal use and prolonged atmospheric exposure. The 7052 glass conforms approximately to the following analysis:

TABLE III.—7052 (BY PERCENTAGE)

| | |
|---|---|
| Silicon oxide ($SiO_2$) | 63.30 |
| Iron oxides plus aluminum oxides ($R_2O_3$) | 6.90 |
| Barium oxide (BaO) | 2.77 |
| Potassium oxide ($K_2O$) | 4.63 |
| Sodium oxide ($Na_2O$) | 2.86 |
| Boron oxide ($B_2O_3$) | 19.53 |
| Sulphur trioxide ($SO_3$) | .01 |
| | 100.00 |

The term "chemically durable glass" as used herein means any glass which will not deteriorate under conditions of normal processing and normal prolonged atmospheric exposure; such glass includes more than 3% of alkalis.

Table IV is presented to show the compatible thermal expansion, softening point, and viscosity, of the 167 KU glass and 7052 glass:

TABLE IV

| Glass Type | 167 KU | 7052 |
|---|---|---|
| Viscosity at 860° C. (in poises) | $10^{5.1}$ | $10^{5.6}$. |
| Softening Point Temperature, ° C | 684 | 708. |
| Coefficient of Thermal Expansion (in./in./° C.) | $46 \times 10^{-7}$ | $46.9 \times 10^{-7}$. |

One can appreciate from Table IV that the coefficients of thermal expansion of the two layers 18 and 19 are sufficiently close that any stresses due to differences in thermal expansion are so small as to be negligible. The softening points and viscosities of the two materials are also sufficiently close that they will flow to substantially the same extent at an appropriately high sealing temperature. The sealing temperature should be high enough to soften the envelope, but not so high as to damage the wafer or excessively soften either of the glasses. Temperatures below 750° C. usually require an unduly long period of time for softening the envelope while temperatures above 870° C. may damage the silicon wafer. I have found that a sealing temperature of 860° C. at a pressure of 16 to 20 p.s.i., represents optimum conditions for expediently sealing silicon wafers as described above.

Any of a number of known processes may be employed for forming the laminated envelope before encapsulation. For example two "precision redraw" cylinders may be formed of each of the two types of glass. The 7052 cylinder is then snugly fitted over the 167 KU cylinder and they are again "redrawn" to form a single cylinder of laminated glass. Redrawing of glass cylinders is a technique well known in the art which involves heating of the glass to above its softening point temperature so that it can be accurately shaped.

Another typical method involves collecting a mass of molten 167 KU glass on the end of a punty iron (blowpipe), inserting this mass into a mass of 7052 glass, and drawing the two to a single cylinder by a technique known in the art as "thermometer tube drawing." Numerous other methods may be used for adhering a protective coating of durable glass on a layer of alkali-free glass to comply with the above description.

It should be understood that my invention can be employed in processes and devices other than those presented for purposes of illustration. Although it is particularly useful with silicon-oxide coated wafers, it may be used with any semiconductor device that is susceptible to contamination from volatile alkali constituents emitted by conventional glasses. Numerous other modifications may be made by those skilled in the art without departing from the spirit and scope of the invention.

What is claimed is:

1. The process of fabricating a semiconductor assembly comprising the steps of:
   - forming a laminated tubular envelope having an inner layer of substantially alkali-free glass and an outer layer of a chemically durable glass which has a composition that is not alkali-free;
   - positioning the envelope around two metal studs which contain a semiconductor element therebetween;
   - heating the envelope to a temperature above the softening point temperature of both of the two layers;
   - increasing the ambient pressure to which the envelope is subjected, thereby forming a seal between the envelope and the two studs;
   - and cooling the envelope.

2. The process of claim 1 wherein the coefficients of thermal expansion of the two glasses are sufficiently similar to eliminate the possibility of cracking from a differential expansion during the heating step.

3. The process of claim 1 wherein the inner layer is made of "167 KU" glass and the outer layer is made of "7052" glass.

4. The process of claim 1 wherein the glass forming the inner layer contains by weight less than 0.2 percent sodium oxide, less than 1.0 percent potassium oxide, less than 2.0 percent lithium oxide, and has a total alkali content of less than 3.0 percent, and wherein the glass forming the outer layer has a total alkali content of more than 3.0 percent.

References Cited by the Examiner

UNITED STATES PATENTS

| | | | |
|---|---|---|---|
| 1,968,822 | 8/1934 | Gaides | 313—221 |
| 2,736,847 | 2/1956 | Barnes | 317—234 |
| 2,863,105 | 12/1958 | Ross | 317—234 |
| 3,032,941 | 5/1962 | Korbitz | 53—22 |
| 3,064,341 | 11/1962 | Masterson | 29—25.3 |
| 3,144,318 | 8/1964 | Bruen | 65—18 |
| 3,170,813 | 2/1965 | Duncan. | |
| 3,178,796 | 4/1965 | Smits | 29—25.3 |
| 3,193,366 | 7/1965 | Clark | 65—54 |

JOHN F. CAMPBELL, *Primary Examiner.*

W. I. BROOKS, *Assistant Examiner.*